Feb. 18, 1964    R. MICEK    3,121,234
SELF-ALIGNING BALL VALVES
Filed Jan. 30, 1962    2 Sheets-Sheet 1
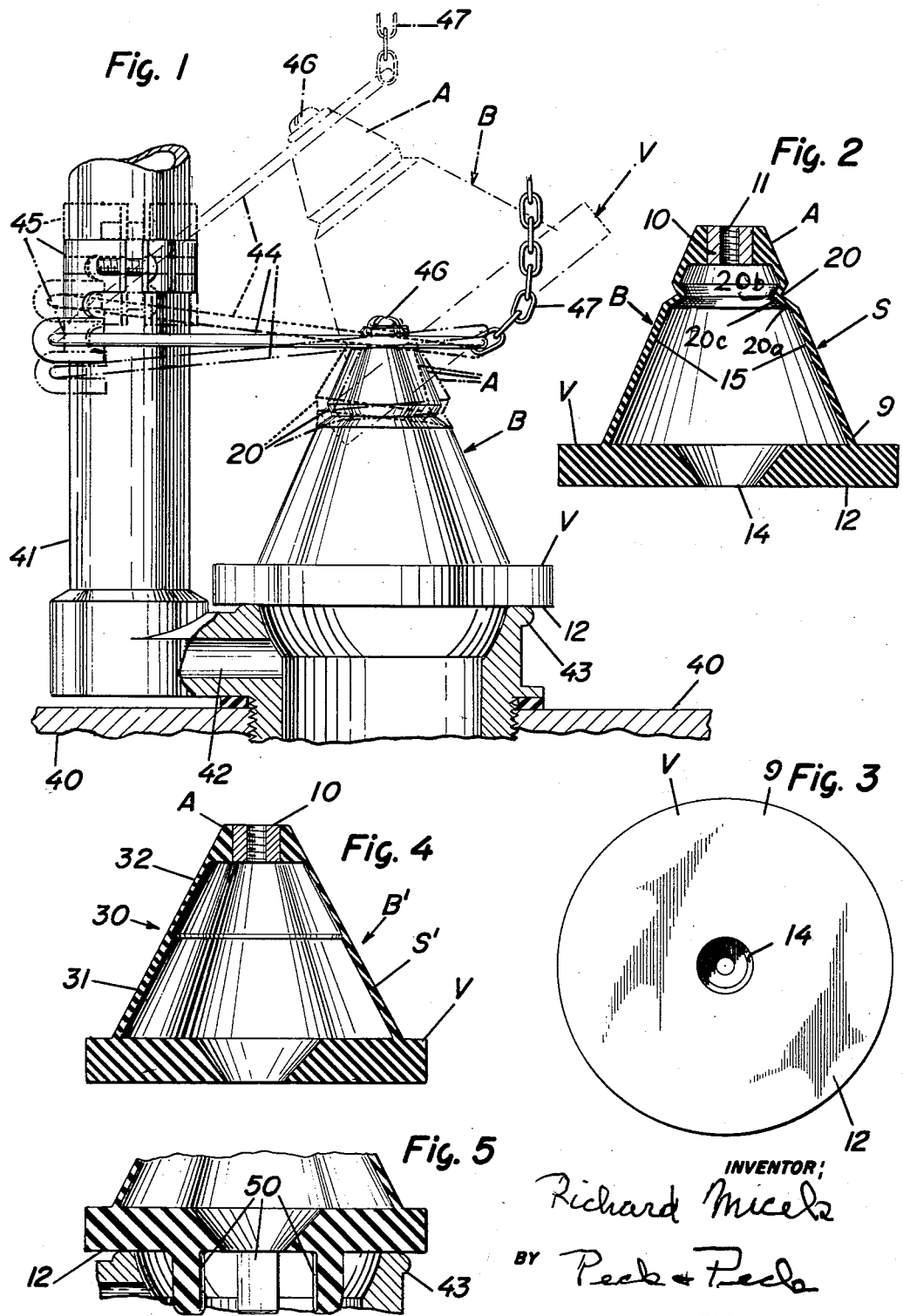
INVENTOR:
Richard Micek
BY Peck & Peck
ATTORNEYS Feb. 18, 1964 R. MICEK 3,121,234
SELF-ALIGNING BALL VALVES
Filed Jan. 30, 1962 2 Sheets-Sheet 2

INVENTOR:
Richard Micek
by Peck + Peck
Attorneys

United States Patent Office 3,121,234
Patented Feb. 18, 1964

3,121,234
SELF-ALIGNING BALL VALVES
Richard Micek, P.O. Box 711, Walsenburg, Colo.
Filed Jan. 30, 1962, Ser. No. 169,832
7 Claims. (Cl. 4—56)

This invention relates to certain improvements in self-aligning ball valves, and particularly to such ball valves for use in toilet flush tanks; and the nature and objects of the invention will be readily recognized and understood by those skilled in the arts to which the invention relates in the light of the following explanation and detailed description of the accompanying drawings illustrating what I now believe to be the preferred embodiments or structural and mechanical expressions of my invention from among various other embodiments, expressions and combinations of which the invention is capable within the broad spirit and scope thereof as defined by the claims hereto appended.

In a widely used type of ball valve mounting for toilet flush tanks for so-called "positive" flush control, as exemplified by the U.S. Patent No. 2,781,520, the mounting structure for the ball valve is attached and positioned on the vertically disposed overflow pipe of the flush tank. Such mounting structure or unit includes a yoke that is pivotally mounted on the unit at the overflow pipe for vertical swinging with a ball valve of the conventional semi-spherical type attached to the outer, free end thereof. The ball valve of such type presents a relatively wide, vertically disposed seating and sealing surface therearound which curves upwardly and outwardly from the lower side or end thereof for seating on and forming a seal with the annular valve seat provided on and around the outlet for flushing water discharge from the tank. So mounted, the semi-spherical ball valve is swung upwardly and downwardly with the pivoted yoke of the unit through a fixed arcuate path about the pivot axis of the yoke from and to seated position on and sealing closed the flushing water outlet from the flush tank.

Such type of ball valve mounting unit includes a bracket for mounting on the overflow pipe and is installed into position by sliding the mounting bracket down over the upper end of the overflow pipe and downwardly along the pipe into the required position for the swinging of the ball valve with the pivoted yoke to and from proper seated and sealed position on the valve seat at the flushing water discharge outlet.

However, with these mounting units for positive flush control utilizing the conventional semi-spherical types of ball valves, it is found difficult in practice to quickly and unerringly mount and attach the bracket of the unit at the exact and precise position circumferentially and axially on and around the overflow pipe so as to accurately center and align the unit and its ball valve for proper seating and sealing of the ball valve on the valve seat of the flushing water discharge outlet from the flush tank. If such a unit is not mounted on the overflow pipe in accurately aligned and centered position, then the semi-spherical ball valve conventionally used therewith will be in misalignment and off-center relative to the valve seat at the flushing water discharge outlet from the tank and will leak and frequently stick or adhere to the wide seating area of the ball valve sufficiently to cause breaking of the pull chain by which the valve ball is to be lifted from the valve seat for the flushing operation, with resulting complete failure of the flush tank to properly function. It has been found, for example, that in certain installations a deviation of a matter of one sixty-fourth of an inch (1/64") from aligned and centered position has been sufficient to cause malfunctioning of a ball valve and the flushing operations controlled thereby.

It is, therefore, a primary object of my invention to overcome and eliminate the effects of misalignment of a ball valve mounting unit of the positive flush control type by providing a design and construction of ball valve which will automatically compensate for any deviations in alignment and centering of the mounting unit and insure proper seating and unseating of the ball valve and efficient functioning of the flush tank whether or not the mounting unit is in the required exact and precise position of alignment and centering required for efficient operation of the unit.

A further object is to provide such a ball valve of a design and construction which is adapted for efficient functioning with other types of ball valve mountings for flush and such like tanks, including the conventional, so-called "lift wire" operated types of flush valves.

Another object is to provide a ball valve of the buoyant, flexible material type having a flat, planar valve seating and sealing surface for engaging on and seating with the valve seat at the flushing water discharge outlet of a flush tank.

Another object is to provide such a ball valve with the flat seating surface thereof formed on and across the lower underside of a valve body which is formed with a flexible section at the upper attachment end thereof for lateral displacement of the attachment end relative to the major, vertical axis of the valve body and flat seating surface at the lower end thereof to compensate for any misalignment and off-centering in the mounting unit.

Another object is to provide a ball valve of the type mounted for vertical displacement to and from seated position on a valve seat which will be self-aligning to compensate for any misalignment of the ball valve relative to its seat so as to insure proper seating and unseating of the ball valve on and from the valve seat.

A further object is to provide a ball valve that will eliminate the necessity for positioning the mounting unit therefor in a precisely centered and aligned mounting position in order to obtain proper operation and functioning of the ball valve.

And another object is to provide such a ball valve of simple design and construction capable of being readily molded at relatively low cost and which will be durable and of relatively long life under the conditions encountered in the operation and use thereof.

With the foregoing and various other objects, features and results in view which will be readily apparent to and recognized by those skilled in the art from the following explanation and detailed description, my invention consists in certain novel features in design and construction of parts and in combinations and functioning thereof, all as will be more fully and particularly referred to and specified hereinafter.

Referring to the accompanying drawings in which similar reference characters refer to corresponding parts throughout the several figures thereof:

FIG. 1 is a view in side elevation of one form of self-aligning ball valve of my invention in mounted operative assembly with a valve mounting structure of the "positive" flush control type in a flush tank, a portion only of the tank and of the mounting structure being shown in side elevation with the bottom wall of the tank and valve seat at the tank discharge being shown in vertical section.

FIG. 2 is a view in vertical section through the ball valve of the invention of FIG. 1.

FIG. 3 is a view in bottom plan of the ball valve of FIGS. 1 and 2.

FIG. 4 is a vertical sectional view through another form of ball valve showing a modified construction of the self-aligning supporting body of such form of the ball valve.

FIG. 5 is a vertical sectional view through the lower portion of the valve body and the valve disc of the form of ball valve of FIG. 4, showing guide cleats or members on and depending from the valve disc.

Figure 6:
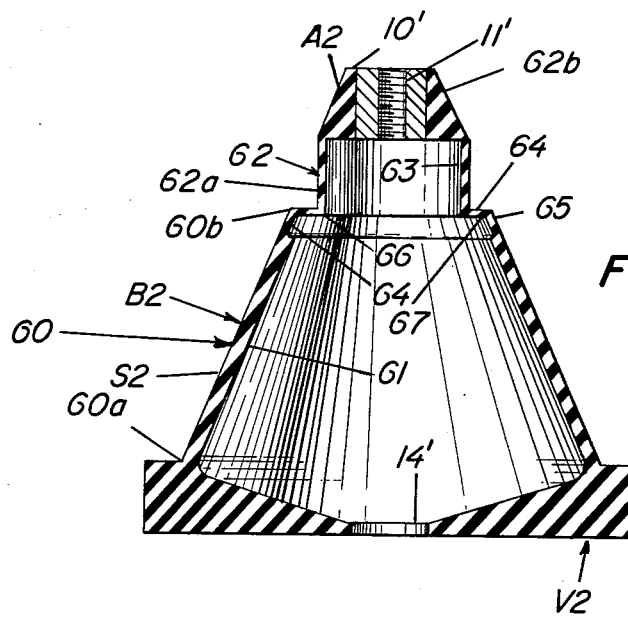
FIG. 6 is a vertical sectional view through a further modified construction of self-aligning ball valve embodying my invention.

Essentially a self-aligning ball valve of my invention is characterized by a hollow, lightweight and buoyant structure formed of a suitable flexible material such as rubber, rubber composition, plastic or other suitable materials, and comprised by a flat bottom wall forming a flat plate or disc valve member and a body member extending upwardly therefrom coaxially therewith and normal to the valve member forming a hollow stem or supporting body member for the valve member for attachment to an operating member of a valve mounting unit with the upper end or attachment portion of the hollow stem or body member being formed for flexing and displacement laterally or radially relative to the axes of the valve member and of the unflexed lower portion of the stem member. Thus, the centering or aligning of a ball valve of the invention relative to its valve seat by the mounting unit for the ball valve is not required as the radial displacement of the upper end portion of the housing or stem member will compensate for any misalignment and non-centering and the disc or flat plate valve will align itself with and seat properly upon its valve seat.

One form of ball valve expressing and carrying out the characteristics of the invention is disclosed by way of example in FIGS. 1, 2 and 3 of the accompanying drawings, being shown in FIG. 1 as mounted and assembled with a mounting and operating unit of the above-identified "positive" flush control type. In this particular form of the invention the ball valve is identified generally by the reference character B and is formed of a one-piece unit molded from rubber to provide the plate or disc valve member V constituting the flat lower or bottom wall thereof and the hollow body or stem member S extending upwardly therefrom terminating in the upper attachment end A. In the illustrated example the flat disc valve member V is of circular plan form, as will be clear from FIG. 3, and the body or stem member S extending upwardly therefrom is in the form of a truncated cone having its lower or base end 9 at and integral with the upper side of the circular disc valve member V and its upper, truncated and reduced diameter end providing the attachment end A of the ball valve B. A solid insert 10 is molded into the upper, attachment end A of the ball valve and this insert is provided with an internally axial threaded bore 11 for threadedly receiving an attaching screw by which the ball valve is attached in mounted position on and to a suitable operating member of a flush control unit.

The disc valve member V of the self-aligning ball valve B is of greater external diameter than the base 9 of the body or stem member S and extends radially outwardly a distance therebeyond and therearound. The disc valve member V is formed to provide the flat, planar seating and sealing surface 12 over the lower or under surface thereof. An axial bore or circular opening 14 is provided through the valve member V and is formed axially tapering through the valve member to a reduced diameter opening through the planar seating surface 12 on the underside thereof. The opening 14 is provided to permit withdrawal of the mold core from within the ball valve upon completion of the molding operation, as will be readily understood by those familiar with the molding art.

The overall height of the ball valve of the specific example of FIG. 1, may be taken to be approximately two inches (2″) and the diameter of the disc valve member V approximately three inches (3″) while the thickness of this disc valve member may be taken to be approximately three-eighths of an inch (⅜″). The body or stem member S of the ball valve B of FIG. 1 is formed by the conical annular wall 15 and in the example hereof this wall when unloaded is self-supporting and shape-sustaining in its conical form extending upwardly from the valve member V and may be taken to have a thickness of approximately one-sixteenth of an inch (1/16″).

In accordance with my invention I provide a relatively narrow annular reentrant band portion, corrugation or "pleat" 20 in and around the wall 15 of body S adjacent but spaced a distance inwardly from the outer attachment end A of the ball valve which is universally flexible and permits radial or lateral displacement of the valve member V and the portion of body S between the valve member and the "pleat" 20 relative to the attachment end portion A of the body S. Thus, it will be clear that if the mounting to which the attachment end portion A of the ball valve B is secured is off-center, then the flat disc valve member V under the forces acting thereon will automatically align and center itself and seat properly on and form the required leak-proof seal with its seat, due to flexing or bending of the body S at the "pleat" 20 with radial displacement of the valve member V to centered position relative to the off-center mounting of the attachment end portion A of the ball valve B. Such condition of self-alignment of the valve member V is indicated by the dotted lines in FIG. 1 of the drawings.

If desired or found expedient, more than one corrugation or "pleat" 20 may be provided, although with a self-aligning ball valve B of the dimensions indicated above, a single "pleat" will be sufficient for the required functioning in accordance with my invention.

Another form of self-aligning ball valve B' of the invention is illustrated in FIG. 4. The ball valve B' includes the flat plate or disc valve V, the frustro-conical body or stem structure S' generally similar to the body S of ball valve B, and the insert 10 in the outer, attachment end of the body S'. Ball valve B' is formed of a suitable flexible material and may be taken to have the same height dimensions and the same diameter and thickness dimensions of the disc valve member V as those given for ball valve B. However, in the form of valve B' the body or stem member S' has the side wall thereof, identified in its entirety by the reference character 30, formed of the thicker section inner length of wall 31 and the thinner section outer length of wall 32. In this specific example the section 31 of wall 30 may be taken to have a thickness of approximately one-sixteenth of an inch (1/16″), and the section 32 of wall 30 between section 31 and the outer attachment end portion A thereof to have a thickness of one-thirty-second of an inch (1/32″). Thus the wall section 32 due to its relatively smaller thickness will flex more readily than the thicker section of wall 31 so that the valve member V and the wall section 31 may be laterally or radially displaced relative to the section 32 and the attachment end portion A at the outer end thereof. Thus, if the ball valve B' is attached to a mounting structure or unit that is off-center or misaligned relative to a valve seat, the thin section wall portion 32 will readily flex for lateral or radial displacement of valve member V relative to the attachment end portion A of the ball valve B'. So in the manner as described above in connection with the ball valve B, the ball valve B' is self-aligning and will automatically compensate for and adjust itself to centered, aligned and properly seated, sealing position on its valve seat, notwithstanding misalignment and non-centering of the attachment end A thereof when in mounted and attached position on a valve mounting unit. The flexing at the wall section 32 of the ball valve B' with the displacement of wall portions 31 and 32 relative to each other for centering and proper seating of valve member V is indicated by dotted lines in FIG. 1.

In FIG. 6 there is illustrated another design and construction of ball valve B2 of the invention, which incorporates generally the principle of the corrugated or "pleated" form of ball valve B of FIG. 2. In the form of FIG. 6 the ball valve B2 is an integral unit formed of a suitable flexible rubber material and includes the flat plate or disc valve V2 which may be taken to have a thickness of ¼" to ⅜" and a diameter of approximately 3". The valve member V2 has the central aperture 14' for the purposes hereinbefore described. The body or stem member S2 is formed of the same flexible material as the valve member V2 and is molded integrally with the latter, such body or stem member extending from one side of the valve member coaxially with the latter. The body or stem member S2 is hollow of generally overall frustro-conical form and is comprised of the inner section 60 consisting of the annular outwardly tapering wall 61 and the outer section 62 coaxial with and in outward axial extension of the inner section 60. The outer section 62 consists of the annular cylindrical wall 63 which is of smaller diameter than the reduced diameter outer end of the inner section 60. The inner section 60 comprises the inner or base end 60a and the outer reduced diameter end 60b. The outer section 62 has the inner open end 62a and the outer end 62b in which there is molded the solid insert portion 10' having the internally threaded, axial bore 11' therethrough for attaching the ball valve B2 to a suitable mounting means.

The inner wall section 60 and the outer wall section 62 of stem member S2 are connected and joined together as the integral body or stem forming member of the ball valve by an annular radially disposed connecting wall 64 which forms a shoulder around and joining the outer end 60b of inner wall section 60 with the inner end 62a of the outer wall section 62, as will be clear by reference to FIG. 6.

Following the principles of my invention the circular wall 63 of outer wall section 62, the connecting wall or shoulder 64 and the wall 61 of inner section 60 at the outer end portion 65 thereof are formed of a wall thickness substantially less than the thickness of the wall 61 of the inner section 60 between valve member V2 and the outer end portion 65. In this particular example the thickness of the wall 61 of inner section 60 may be taken to be ⅟₁₆", and the thickness of the walls 63, 64 and 65 may be taken to be ⅟₃₂". Thus the construction is such that the thin wall section 65 constituting the outer end portion of inner section 60 with the thin wall connecting shoulder 63 and the thin wall outer section 62 provide for ready flexing and lateral or radial displacement of the outer section 62 with the attachment insert 10' at the outer end thereof, relative to the inner section 60, in the manner as hereinbefore described relative to the forms of the invention of FIGS. 2 and 4. It will be apparent that the thin wall end portion 65 of inner section 60, the shoulder forming connecting wall 64, and the wall 63 of the outer section 62 in effect function generally in the manner of the corrugated or "pleated" form of ball valve of FIG. 2, with the annular edges 66 and 67 along which the wall 63 is connected to the inner and outer sections 60 and 62, respectively, forming hinge or flexing lines or edges functioning to permit lateral or radial displacement of the outer section 62 relative to the inner section 60 of the body or stem member S2.

Figure 7:
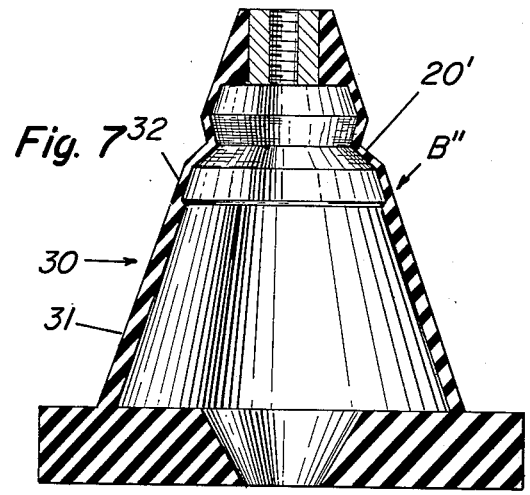
FIG. 7 is a vertical sectional view through still another form of the self-aligning ball valve.

In FIG. 7 a form of ball valve B" is shown which comprises the construction of ball valve unit B' of FIG. 4 with a corrugation or pleat 20' incorporated in the outer, thin walled section 32 of the body or stem member S' of the ball valve unit. This pleat 20' in the ball valve unit B" of FIG. 7 is of the type, construction and functioning of the corrugation or pleat 20 of the ball valve unit B of FIG. 2, and will be readily understood from the description and explanation hereinabove of the functioning of the latter.

A ball valve of the invention in the form thereof of FIG. 2, is shown in FIG. 1 of the drawings in the operative mounted position on a flush tank control mechanism of the "positive" type. A portion of a toilet flush tank 40 is shown having the usual overflow pipe 41 communicating with an outlet 42 through the bottom of the tank. Outlet 42 constitutes the flushing water discharge outlet and is provided at its upper end with the upstanding collar providing the annular valve seat 43 for receiving and seating thereon a ball valve to seal therewith and close outlet 42. A yoke member 44 is pivotally mounted to a bracket 45 which is fitted down on and attached to the overflow pipe 41 at a location thereon spaced above valve seat 43. The yoke member is vertically swingable and a ball valve B of the invention is fixedly attached to the outer end thereof by the attaching screw 46 threaded into bore 11 of the upper, attachment end A of the ball valve. In mounted position ball valve B depends from yoke 44 and with the latter in its downwardly swung position seats upon, seals and closes outlet 42 by the flat, planar seating surface 12 of the disc valve member V engaging completely on and around the annular valve seat 43, as will be clear by reference to FIG. 1 of the drawings. The usual chain or similar element 47 is connected to the yoke 44 and ball valve B and extends to the valve trip lever (not shown) accessible at the exterior of the tank 40 for flushing operation of the valve B.

With the "positive" type of flush control shown in FIG. 1, if the bracket 45 and yoke 44 are positioned at a location on overflow pipe 41 that is too low relative to the valve seat 43, then the disc valve member V in lowered position on seat 43 will raise several degrees at the front thereof, while if positioned too high, the disc valve member will raise several degrees at the rear thereof. However, in operation the weight of the water acting on the wide area presented by a ball valve of the invention, and with the ball valve in lowered position, will through the flexing or buckling of the body or stem member S at the "pleat" 20 of the ball valve B, or the thin wall section of ball valve B', cause the disc valve member V to displace into full and proper seating engagement on and with seat 43 with the valve member thus displaced laterally relatively to the attachment end portion A of the ball valve. In the flushing operation, due to the fact that a ball valve B or B' of the invention is attached to the outer end of yoke 44 which has a fixed pivot at the overflow pipe 41, when the ball valve is lifted by means of chain 47, the flat, disc valve member B is peeled off the seat 43 at the forward side thereof first, and the instant that the contact of valve member V with the valve seat 43 is broken, the ball valve due to its buoyancy will rise up through the water in the tank swinging yoke 44 upwardly with it to position in which the ball valve is completely clear of flushing discharge outlet 42. Upon emptying or depletion of the tank the ball valve with its carrying yoke 44 swings downwardly to position on the valve seat 43, functioning in accordance with the invention to properly align and center itself on its valve through the flex or buckling provided for in the body between the valve member V and the upper attachment end A of the ball valve.

The example ball valves B', B" and B2 of the invention may be used with the conventional "non-positive" types of flush controls such as those using "lift wires" familiar in this art. However, where a ball valve of the invention is to be used with such non-positive types of flush controls, I have provided a form thereof in which guide fingers or cleats 50 are molded integrally with the flat plate disc valve member V spaced apart on and dependent in general parallelism from the under or seating side of the valve member as shown in FIG. 5 of the drawings. These guide fingers or cleats 50 are located and positioned in the area of the underside or seating surface 12 of the valve member V surrounded by but clear of the outer, annular peripheral area of surface 12 which is adapted to engage with and seat on the valve seat with which the ball valve is to be used. Such arrangement of guide cleats 50 will assist the ball valve unit in taking full advantage of its self-aligning flexing of a ball valve unit of the invention when such unit is used with the non-positive types of flush control. The guide cleats 50 will by entering into the outlet 42 surrounded by a valve seat 43 as the valve member V is lowered, insure perfect seating and sealing in the closed position of the ball valve unit with a minimum of adjustment required in aligning the operating members of the flush control relative to the valve seat and the ball valve unit.

The form of ball valve unit B of the invention of FIGS. 1, 2 and 3 having the reentrant portion, corrugation, and "pleat" 20 provides such corrugation or pleat with the inwardly converging walls 20a and 20b as a corrugation or pleat of V shape in cross section. Thus there is provided the annular edge 20c formed by the joined inner edges of the walls 20a and 20b so that an effective hinge or flex line results on which universal flexing of the attachment end portion A of the ball valve unit B relative to the major portion of the stem member S and the flat disc valve V results. And similarly, it is to be noted that in the form of ball valve unit B2 of FIG. 6, a similar hinge line or lines are provided by the edges 62a and 62b along which the inner end 62a of outer section 62 and the outer end 60b of inner section 60 are joined and connected. In the same manner, extremely easy and efficient flexing and radial or lateral displacement of outer section 62 relative to inner section 60 for self-aligning of the ball valve unit B2 for compensating for misalignment and off-centering of the mounting means for the ball valve unit relative to the seating plane of the valve seat and the seating surface of the valve member V2 is made possible.

It will also be evident that various other changes, modifications, eliminations, substitutions and additions may be resorted to without departing from the broad spirit and scope of my invention, and, hence, I do not intend or desire to limit my invention to the exact and specific examples thereof herein disclosed except as may be required by intended limitations thereto appearing in any of the claims hereto appended.

What I claim is:

1. A ball valve comprising, in combination, a flat disc valve member, a hollow stem member including an annular side wall therearound extending from one side of and coaxial with said valve member, said stem member being of smaller diameter at said valve member than the diameter of the latter and at the outer end thereof opposite said valve member being adapted for attachment to a mounting member for said ball valve, and said annular wall of said stem member being formed with a reentrant portion therein and therearound coaxial therewith adjacent said outer attachment end thereof providing an inwardly extending pleat for flexing and displacement radially of said attachment end of said stem member relative to the axis of said valve member and said stem member.

2. In the combination of claim 1, said inwardly extending pleat being of V-shape in cross section and comprised of inwardly diverging side walls joined at their inner edges to form a continuous annular edge providing a bending line for universal lateral flexing of said outer attachment end of said stem member relative to the remainder thereof and to said flat disc valve member.

3. A ball valve unit comprising, in combination, a flat disc valve member for seating in fixed position on a valve seat, a hollow stem member consisting of an annular wall extending from one side of said valve member coaxial therewith and being of smaller diameter at the end thereof at said valve member than the diameter of the latter, said hollow stem member at the opposite outer end portion adapted for attachment to a valve mounting member, and the outer length of said annular wall of said stem member from a location adjacent said outer attachment end thereof to a location therearound spaced inwardly therealong being of less thickness than the thickness of the wall of the inner length of said annular wall extending to said valve member for ready flexing for radial displacement of said outer end attachment portion relative to the thicker walled inner length of said stem member and to said valve member when said valve member is in fixed position seated on a valve seat.

4. A ball valve unit of flexible material comprising, in combination, a flat valve member; a hollow stem member extending from one side of said valve member coaxial therewith; said hollow stem member including an inner section formed by an annular wall of less diameter than and extending coaxially outwardly from said flat valve member, an outer section formed by an annular wall of smaller diameter than the diameter of the outer end of said wall of said inner section in axial outward continuation of the latter, and an annular radially disposed connecting wall forming a shoulder around and joining the outer end of said inner section with the inner end of said outer section; said outer wall section, said shoulder forming connecting wall, and the outer end portion of said annular wall of said inner section all being substantially less in wall thickness than the wall thickness of said annular wall of said inner section between said flat valve member and said outer end portion of said wall of said inner section; and attachment means provided at the outer end of said outer section for rigid attachment of said stem member of said ball valve unit in mounted position.

5. In the combination of claim 4, the annular wall of said inner section of said stem member being outwardly tapered and of frustro-conical form, and the wall of said outer section being of substantially circular form.

6. A ball valve unit of flexible material comprising, in combination, a flat valve member; a hollow stem member of flexible material extending from one side of said valve member coaxial therewith; said hollow stem member including an inner section formed by an annular wall of less diameter than and extending coaxially outwardly from said flat valve member, an outer section formed by an annular wall of smaller diameter than the diameter of the outer end of said wall of said inner section in axial outward continuation of the latter, and an annular radially disposed connecting wall substantially normal to the axis of said hollow stem member forming a shoulder around and joining the outer end of said inner section with the inner end of said outer section; said outer wall section having the wall thereof of less thickness than the thickness of said inner wall section throughout the major length thereof outwardly from said valve member; and attachment means provided at the outer end of said outer section for rigid attachment of said stem member to ball valve unit operating means.

7. A ball valve unit of the buoyant type comprising, in combination, a flat valve member having an annular seating and sealing surface on one side thereof for seating on and sealing with an annular valve seat; a hollow stem member of flexible material extending from the side of said valve member opposite said annular valve seat; said hollow stem member including an inner section formed by an annular wall of flexible material of less diameter than and extending outwardly from and coaxial with said valve member, an outer section formed by an annular wall of flexible material of smaller diameter than the diameter of the outer end of said annular wall of said inner section and extending in outward continuation of and coaxial with said inner section, and an annular, radially disposed connecting wall of flexible material forming a shoulder around and joining the outer end of said annular wall of said inner section with the inner end of said annular wall of said outer section; attachment means at the outer end of said outer section for rigid attachment of said hollow stem member to ball valve operating means; and said annular wall of said outer section of said hollow stem member and the outer end portion of said annular wall of said inner section being less in wall thickness than the maximum wall thickness of the major length of said annular wall of said inner section between said valve member and said outer end portion of said wall of said inner section for radial displacement of said outer section of said hollow stem member relative to the axis of said ball valve unit when the latter is in position with said annular seating surface of said flat valve member maintained in seated position on an annular valve seat.

References Cited in the file of this patent

UNITED STATES PATENTS

| | | |
|---|---|---|
| 909,789 | Hawks | Jan. 12, 1909 |
| 1,807,450 | Starkey | May 26, 1931 |
| 2,475,681 | Stentz | July 12, 1949 |
| 2,705,808 | Crockett | Apr. 12, 1953 |